(12) United States Patent
Wong et al.

(10) Patent No.: US 11,378,994 B2
(45) Date of Patent: *Jul. 5, 2022

(54) SYSTEMS AND METHODS FOR GRID OPERATING SYSTEMS IN ELECTRIC POWER SYSTEMS

(71) Applicant: Opus One Solutions Energy Corp., Richmond Hill (CA)

(72) Inventors: Joshua Wong, North York (CA); Cedric Tai, Toronto (CA); Reza Iravani, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/902,973

(22) Filed: Jun. 16, 2020

(65) Prior Publication Data

US 2020/0379494 A1 Dec. 3, 2020

Related U.S. Application Data

(63) Continuation of application No. 14/480,038, filed on Sep. 8, 2014, now Pat. No. 10,684,636.

(Continued)

(51) Int. Cl.
  *G05F 1/66* (2006.01)
  *H02J 3/38* (2006.01)
  (Continued)

(52) U.S. Cl.
  CPC ............ G05F 1/66 (2013.01); G05B 15/02 (2013.01); H02J 3/38 (2013.01);
  (Continued)

(58) Field of Classification Search
  None
  See application file for complete search history.

(56) References Cited

U.S. PATENT DOCUMENTS

| | | | |
|---|---|---|---|
| 8,275,485 B2 * | 9/2012 | Schweitzer, III . | H02J 13/00034 700/286 |
| 8,886,362 B2 * | 11/2014 | Krok ................... | H02J 3/14 700/291 |

(Continued)

OTHER PUBLICATIONS

Gao et al., "A survey of communication/networking in Smart Grids", Elsevier B.V., 2011, 14pg. (Year: 2011).*

(Continued)

*Primary Examiner* — Ryan D. Coyer
(74) *Attorney, Agent, or Firm* — Kurtz Firm, PLLC (57) ABSTRACT

In an embodiment, a power distribution automation applications network includes multiple intelligent nodes in communication with each other, each having a hardware and software platform, with data processing and communications functionality. The intelligent nodes are integrated or embedded with grid components. The nodes each implement a part or whole of a grid operating system that includes a set of software applications for automated and supervisory monitoring, control, protection, and optimization of an electric power system with embedded distributed energy resources and distributed information resources. The grid operating system both manages the grid and facilitates the integration of distributed energy resources and distributed information resources in an electric power system.

17 Claims, 3 Drawing Sheets

Related U.S. Application Data (60) Provisional application No. 61/874,647, filed on Sep. 6, 2013.

(51) Int. Cl.
*H02J 13/00* (2006.01)
*G05B 15/02* (2006.01)

(52) U.S. Cl.
CPC .... *H02J 13/00006* (2020.01); *H02J 13/0013* (2013.01); *Y02E 40/70* (2013.01); *Y02E 60/00* (2013.01); *Y04S 10/12* (2013.01); *Y04S 10/18* (2013.01); *Y04S 40/12* (2013.01)

(56) References Cited

U.S. PATENT DOCUMENTS

| | | | | |
|---|---|---|---|---|
| 2003/0187550 A1* | 10/2003 | Wilson | ............... | H02J 3/38 700/295 |
| 2006/0112061 A1* | 5/2006 | Masurkar | ............... | G06F 11/0709 706/47 |
| 2009/0228324 A1* | 9/2009 | Ambrosio | ............... | G06Q 10/063 705/7.11 |
| 2009/0326724 A1* | 12/2009 | Lasseter | ............... | H02P 9/04 700/287 |
| 2010/0191489 A1* | 7/2010 | Zolot | ............... | H02J 3/38 702/62 |
| 2012/0101639 A1* | 4/2012 | Carralero | ............... | G06F 1/26 700/286 |
| 2012/0239216 A1* | 9/2012 | Kulathu | ............... | H02J 13/0006 700/295 |
| 2013/0035800 A1* | 2/2013 | Kulathu | ............... | H02H 7/261 700/295 |
| 2015/0005970 A1* | 1/2015 | Zweigle | ............... | G05B 13/048 700/295 |

OTHER PUBLICATIONS

Gungor et al., "A Survey on Smart Grid Potential Applications and Communication Requirements", IEEE, Feb. 2013, 15pg. (Year: 2013).*

Wang et al., "A survey on the communication architectures in smart grid", Elsevier B.V., 2011, 26pg. (Year: 2011).*

Yan et al., "A Survey on Smart Grid Communication Infrastructures: Motivations, Requirements and Challenges", IEEE, 2013, 16pg. (Year: 2013).*

* cited by examiner

SYSTEMS AND METHODS FOR GRID OPERATING SYSTEMS IN ELECTRIC POWER SYSTEMS

This application is a continuation of U.S. patent application Ser. No. 14/480,038 filed Sep. 8, 2014, which is a non-provisional of and claims the benefit of U.S. Provisional Patent Application No. 61/874,647 filed Sep. 6, 2013, the entire disclosures of which are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of electric power systems, and in particular to systems and methods for grid operating systems, distribution management systems, distribution energy management systems, and distributed energy resource management systems.

BACKGROUND

The introduction and integration of distributed energy resources (DER) into the electric power system (EPS, or "grid") has become a priority in the modern energy era. DERs include that of generation (such as photovoltaic, wind, diesel, and natural gas generators), demand (such as buildings, homes, and electric vehicles), and storage (such as batteries, flywheels, capacitors, and pumped hydro) resources. In particular, the integration of renewable energy sources and electric vehicles onto the grid has many important economic and environmental benefits. Distributed energy storage (DES) is considered a "missing piece" of the distribution system, performing functions such as peak shaving/valley filling, volt/var optimization, capacity relief, power quality management, buffering the intermittency and variability of supply (e.g. renewable generation) and demand (e.g. electric vehicle charging), providing backup power, and participating in power system ancillary services.

The EPS was originally designed with one-way power flow from the centralized generators to end loads. As DERs apply for access onto the grid, utilities conduct a breadth of analyses to determine its potential effects on the system. Through a connection impact assessment process, utilities perform studies to evaluate parameters including voltage, frequency, power factor, clearing times for protection, load/generation balance, transfer/remote trip, and reconnection times. With a small amount of distributed generation (DG) connections on a power system feeder relative to its load levels, hence a lower level of penetration, the strength of the main grid will mitigate any issues from the DGs and there will be no concerns for affecting grid operating standards.

One challenge is that as DGs come online at a higher level of penetration, the strength of the connected DGs will affect, at least on an aggregate level in a local area, the operating conditions of the grid and raise tangible technical concerns with the safe, reliable, and cost-effective operation of the EPS. Effects include complex and two-way power flows, intermittent and variable generation, and power quality phenomena. The result is an ever-increasing complexity in planning and operating the grid, and potentially requires infrastructure upgrades, such as in the form of cables, wires, switchgear, transformers, controls, and grid communications, to accommodate the extra capacity from DGs.

Challenges associated with demand resources include that of passive and unresponsive loads, lack of demand elasticity, uncertainty and variability over rising impact of electric vehicle charging demand, lack of direct control, and that current direct control is based on pricing or bulk power system signals, rather than coordinated with local distribution system opportunities and constraints.

Challenges associated with DES include cost of equipment, cost of installation, uncertain business model (including ownership and revenue streams), and uncertain operating schemes for multi-service applications. In particular, current operating schemes for DES are often limited to static, pre-programmed, and time-of-use settings, external command and control, and decision making from locally monitored variables.

Combining multiple DERs, a microgrid can be formed to operate in concert with the main grid in grid-connected mode or autonomously and independently from the grid in islanded mode. Challenges associated with microgrids include cost of equipment, cost of installation, uncertain business model, and uncertain operating schemes for multi-service, multi-tiered applications. A microgrid typically needs to optimize the operation of its internal DERs within the microgrid, as well as offer services to the upstream distribution system for inter-tiered operation. The microgrid may also need to dynamically reconfigure the topology and connection into the distribution system to its grid-connected and islanded operations.

Management and automated operation of DERs are important to enable and facilitate their integration and avoid costly infrastructure upgrades. Without proper and intelligent controls coordinated with the utility, these resources will treat the grid as a "black box" and supply or consume uncontrolled, unmanaged power to and from the grid, and continue to press ever-higher demands and stress on an already aging and congested grid. Many of today's DERs are unmonitored, uncontrolled, and only has local protection that are static and "set-and-forget", without realizing value from the myriad of coordinated grid services. Utilities currently carry out connection impact assessments (CIA) on DER applications to connect. For DERs that exceed grid conditions upon connection, utilities may deny access to the EPS or request certain upgrades to be done on the grid or at the DER site.

Today's Distribution Management Systems (DMS) are typically not Energy Management Systems (EMS). Their primary purpose is for work scheduling, system switching, and outage management, while integrating with a utility's Geographical Information System (GIS) and Customer Information System (CIS). Distribution systems were furthermore operated as an on/off switching network, where the major system functions are to maintain continuity of service, reroute power, detect faults, and restore customers. In contrast, EMS functions are performed on supply and demand sides. Energy management on the supply side is typically performed on the bulk power system (e.g. by the independent system operators) with centralized generators on the energy market, to perform functions including unit commitment, economic dispatch, optimal power flow, ancillary services, and regulation services while maintaining minute by minute supply/demand balance. Energy management on the demand side is typically performed through conservation and demand response programs and premise (e.g. building, home) management and automation systems. Both of these approaches have little or no significance for distribution system operations. Upstream and downstream management systems are not interoperating with the distribution system's DMS, and little value can be attained for the local distribution companies. The rise of Distributed Energy Resource Management Systems (DERMS) attempts to address the optimal dispatch of DERs, but rarely considers distribution system dynamic constraints and real time operations in its decision making.

The integration of DERs is typically managed as follows:

Restrict access—through connection impact assessments and system planning studies, utilities determine that the proposed DER connection will adversely impact the EPS and are not allowed to connect to the grid. This method does not facilitate the integration of DERs on the EPS.

EPS expansion—through connection impact assessments and system planning studies, utilities determine that the proposed DER connection may adversely impact the EPS and are allowed to connect to the grid, but utility infrastructure expansions such as cables, wires, transformers, and circuit breakers will be required. This method can accommodate a level of penetration of DERs on the EPS in proportion to the level of expansions, but will be expensive and labor intensive.

Protected and unmanaged DER—through connection impact assessments and system planning studies, utilities determine that the proposed DER connection will not adversely impact the EPS and are allowed to connect to the grid without real time management in the form of monitoring and control. Protection systems are in place such as fault detection, isolation, and anti-islanding. This method can only accommodate a low level of penetration of DERs on the EPS.

Monitored and protected DER—through connection impact assessments and system planning studies, utilities determine that the proposed DER connection may adversely impact the EPS, but it is allowed to connect to the grid, with DER operating conditions monitored and sent back to the utility. Protection systems are in place such as fault detection, isolation, and anti-islanding. This method can typically only accommodate a low level of penetration of DERs on the EPS.

Centralized management of DER—through connection impact assessments and system planning studies, utilities determine that the proposed DER connection may adversely impact the EPS but are allowed to connect to the grid with DER management. Management is carried out centrally in the utility network operating centre (NOC) with communications, monitoring, and control to all DER sites, typically in the form of Supervisory Control and Data Acquisition (SCADA) systems, Distribution Management Systems (DMS), Distribution Energy Management Systems (DEMS), or Distributed Energy Resource Management Systems (DERMS). This method can potentially accommodate a high level of penetration of DERs on the EPS, but can be expensive, non-modular, non-scalable, with high operational latencies, and complex integration challenges.

Decentralized management of DER—through connection impact assessments and system planning studies, utilities determine that the proposed DER connection may adversely impact the EPS but are allowed to connect to the grid with DER management. Management is carried out in a decentralized fashion along the EPS, with communications, monitoring, and control to all DER sites, such as in the form of smart inverters, and coordinated centrally with the utility network operating centre (NOC). This method can be less expensive, more modular, scalable, operationally faster, and simpler to integrate as a decentralized management solution, but today's state-of-the-art lacks the power system analysis and control capabilities of centralized solutions, with primary functions restricted to remote monitoring and disconnect/reconnect.

In addition to DERs, distributed information resources (DIR) have a critical role in the integrated and coordinated operation of the EPS, especially in the development of smart and intelligent grids. DIRs include that of information generation (such as sensors, smart meter, metering collectors, line monitors, and other data systems), consumption (such as human machine interfaces, visualization tools, business intelligence tools, intelligent electronic devices, switch controllers, circuit breakers, capacitor controllers, reclosure controllers, voltage regulator controllers, power electronic settings, operating modes, utility network operating centers, and other control devices and data systems), and storage (such as local databases, central databases, and cloud-based systems) resources.

The EPS was originally designed as an analog system without DIRs, with decisions and control actions being made using local measurements. With the advance of information and communications technology (ICT), the EPS has seen a substantial increase in the number of DIRs. These DIRs can be interconnected via a main backhaul to a centralized computing system such as SCADA and DMS, a distributed backhaul to a centralized computing system, or a distributed backhaul to distributed computing systems.

Challenges with DIRs include that of two-way information flow, data volume, scalability, security, privacy, disparate communication paths to centralized or distributed computing systems, interoperability in communications, and inoperability in functional operations. These become barriers to integrated and coordinated grid operations, such as in crossing multiple functional streams (e.g. smart metering data for billing, asset management, and real time system operations).

SUMMARY

One objective of the disclosed system and method is to provide a real time Grid Operating System (GOS) to facilitate the integrated, coordinated, and intelligent management and operation of such DERs and DIRs into the EPS, including transmission and distribution (T&D) systems. It applies advanced information and communication "smart grid" technologies, to manage the connection and operation of the DERs and DIRs on the grid.

The invention provides, in an embodiment, a GOS that is configured to facilitate the integration of DERs and DIRs in an EPS. The GOS can be defined as a set of analysis and decision making tools for automated and supervisory monitoring, control, protection, and optimization of an EPS with embedded DERs and DIRs, with provision for operator intervention. The disclosed GOS, in an embodiment, manages energy from all or part of DERs connected in the grid, including:

Energy supply resources—generation, such as photovoltaic, wind, diesel, and natural gas generators;

Energy demand resources—loads, such as heating, ventilation, and air condition (HVAC) systems, thermostat controls, lighting systems, ice rinks, industrial processes, and electric vehicles;

Energy storage resources—dispatchable storage resources, such as batteries, capacitors, flywheels, pumped hydro, and other forms of energy storage.

The disclosed GOS, in an embodiment, also manages information from all or part of DIRs connected in the grid, including:

Information generation—such as sensors, meters, monitors, and other data systems;

Information consumption—such as human machine interfaces, visualization tools, business intelligence tools, intelligent electronic devices, switches, circuit breakers, capacitors, power electronic settings, operating modes, and other control devices and data systems;

Information storage—such as local databases, central databases, and cloud-based systems.

The GOS is an enabler of active distribution systems, flexible grids, and grid-connected microgrids.

Novel aspects of the disclosed system include the following. It is distributed. In this respect, the system can be centralized at one Intelligent Node (IN) or decentralized across multiple INs. It is intelligent. In this respect, the system can perform advanced power system functions, including electric model-based computations, through codified algorithms and control schemes. It is modular, and can perform its functions independently as one IN and as a group of INs, where the loss of one or more INs will not lead to the failure of the GOS. It is scalable. In this respect the system can perform its functions without limitation to the total number of intelligent nodes. It is configurable. In this respect, the system can be configured with adjustable settings to meet the requirements of a large variety of node types and system configurations. It is adaptive. In this respect, the system can adjust its operations based on real time "as operated" power system behaviors, topology, configurations, and operating conditions, being a dynamic and active management system. It is multi-staged. In this respect, the system can operate on multiple stages in terms of time and criteria, including short term horizons for week-ahead, day-ahead, and immediate online operations. It is multi-tiered. In this respect, the system can operate, interoperate, and coordinate on multiple tiers in terms of EPS hierarchy, such as centralized generation, transmission, distribution, sub-distribution or community, and "behind the meter" customer applications.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for a grid operating system (GOS). It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The GOS can be implemented as a centralized management system at the utility network operating centre (NOC), or a decentralized management system across electrical substations, feeders, and devices. The GOS architecture is fractal in design where the each GOS is self-similar and can build into bigger GOS making it scalable and reliable. Operations for the GOS are carried out on at least one intelligent node (IN) which acts as the brains of the grid.

Each IN consists of a hardware and software platform, with data/information processing (e.g. intelligence, decision making) and communications (e.g. networking, protocol conversion, local and wide area) capabilities. INs are integrated or embedded with grid components such as DER controllers, sensors, metering collectors, switch controllers, and substation intelligent electronic devices (IED). An IN can also be a computing device at the utility NOC carrying out GOS functions at the utility site.

GOS functions are carried out via software applications (apps) installed in the processing unit of each IN. By coupling or embedding INs with grid components, apps act as agents to each grid component to coordinate its operation with the overall grid, providing local area, wide area, and multi-tiered grid services. One or more apps may be installed in each IN. Processing of applications can be performed in one IN, multiple INs, or distributed throughout the network of INs (IN network) and coordinated to provide advanced grid services.

The overall IN network can be described as a distributed automation applications network (DAAN), where the grid functions are performed through software applications in INs, carrying out EPS automation services. The main features of the apps are six-fold:

Distributed—can be centralized at one IN or decentralized across multiple Ins.

Intelligent—can perform advanced power system functions through codified algorithms and control schemes.

Modular—can perform its functions independently as one IN and as a group of INs, where the loss of one or more INs will not lead to the failure of the GOS Scalable—can perform its functions without limitation to the total number of intelligent nodes.

Configurable—can be configured with adjustable settings to meet the requirements of a large variety of node types and system configurations.

Adaptive—can adjust its operations based on real time power system behaviors and operating conditions, being a dynamic and active management system.

Multi-staged—can operate on multiple stages in terms of time and criteria, including short term horizons for week-ahead, day-ahead, and immediate online operations.

Multi-tiered—can operate, interoperate, and coordinate with other GOSs on multiple tiers in an EPS hierarchy, such as centralized generation, transmission, distribution, sub-distribution or community, and "behind the meter" customer applications.

Figure 1:
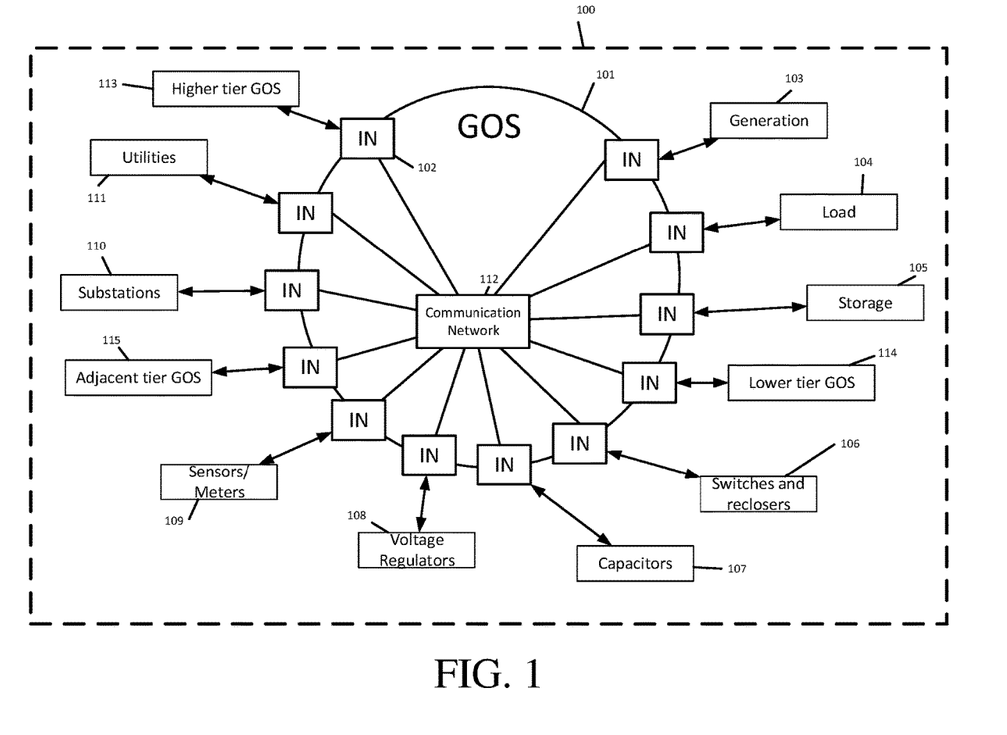
FIG. 1 shows a schematic block diagram illustrating a Distribution Automation Applications Network (DAAN) forming the function of a GOS.

FIG. 1 shows a schematic block diagram illustrating a Distribution Automation Applications Network (DAAN) forming the function of a Grid Operating System (GOS). The DAAN 100 connects the areas and components of the EPS to perform the integrated function of a GOS. The Distributed automation applications network 100 is a network of intelligent nodes, communications network, and electric system components 103-111 with embedded applications to perform distributed automation functions, including that of the GOS 101.

In an embodiment, the Grid Operating System 101 is a set of analysis and decision making tools for automated and supervisory monitoring, control, protection, and optimization of an EPS with embedded DERs, with provision for operator intervention.

Intelligent nodes 102 each comprise a communicating and computing nodal device, integrated with and/or or embedded into one or more electric system components (103-111), as the interfacing agent and distributed computing processor for the GOS 101.

The electric system components comprise generation 103, load 104, storage 105, switches and reclosers 106, capacitors 107, voltage regulators 108, sensors/meters 109, substations 110, and utilities 111. Generation 103 provides a supply of power in the EPS. Loads 104 represent a demand of power in the EPS. Storage 105 provides a reserve of power supply and demand in the EPS. Switches and reclosers 106 are the EPS components that disconnect and reconnect power along the EPS. Capacitors 107 are the EPS component that injects reactive power into the EPS. Voltage regulators 108 are the EPS component that adjusts and maintains the voltage level at a certain point of the EPS. Sensors/meters 109 are the EPS components that measure and monitor electric system parameters at a certain point of the EPS. Substations 110 are the central areas of the EPS that provide voltage transformation, protection, and control including equipment such as Transformers, Load Tap Changers, Circuit Breakers, Protection Relays, and Switches. One or more utilities 111 are the transmission and distribution companies as well as independent system operators, market operators, and regional operators. The utilities 111 typically have central network operating centers and enterprise networks.

With continued reference to FIG. 1, a communications network/field messaging bus 112 is an existing or new network that is accessible by the utilities and intelligent nodes. The higher-tier GOS 113 is another GOS operating in a higher tier in multi-tiered operations. The lower-tier GOS 114 likewise is another GOS operating in a lower tier in multi-tiered operations, and the adjacent-tier GOS 115 is another GOS operating in the same tier in multi-tiered operations.

Figure 2:
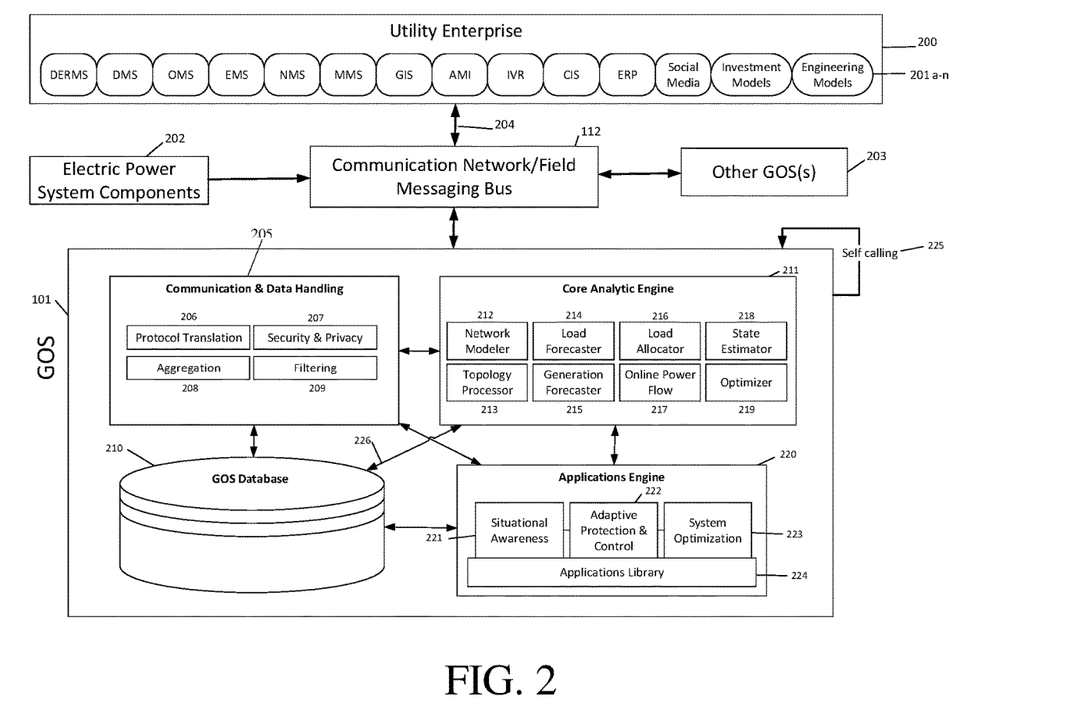
FIG. 2 shows a schematic block diagram illustrating the GOS operational methodology and core functions.

FIG. 2 shows a schematic block diagram illustrating the GOS operational methodology and core functions in accordance with an embodiment. In FIG. 2, the utility enterprise 200 includes a multitude of systems in one or more utilities that may interface with the GOS. The components 201 of utility enterprise applications 200 are the Distributed Energy Resource Management System (DERMS), the Distribution Management System (DMS), the Outage Management System (OMS), the Energy Management System (EMS), the Network Management System (NMS), the Meter Management System (MMS), the Geographic Information System (GIS), the Advance Metering Infrastructure (AMI), the Interactive Voice Recognition (IVR), the Customer Information System (CIS), Enterprise Resource Planning (ERP), social media applications, investment models and engineering models. With respect to social media applications, these are applications that enable EPS users to create and share content, as well as participate in social networking functions. Investment models provide project costing, reliability indices, investment impacts, and the like. Engineering models are engineering representation of EPS components, with associated engineering software such as software for simulation of EPS behavior.

With continued reference to FIG. 2, electric power system components 202 represent the components 103-110 discussed above with reference to FIG. 1. Other grid operating system 203 is a higher, lower or adjacent tier GOS that is connected to the Communication Network/Field Messaging Bus. Reference number 204 shows bi-directional data flow between Utility Enterprise application and the GOS via a common Communication Network. The communication and data handling component 205 manages all messaging and interfaces between the GOS 101, Utility 111, and EPS components 103-110. Protocol translation component 206 provides conversion of communication messages from one protocol to another. Security and privacy component 207 is configured to perform cyber security and information privacy functions. An aggregation component 208 aggregates data messages from multiple sources, locations, and times. Filtering component 209 sorts, prioritizes and selects data messages. GOS Database 210 is a combination of multiple databases including a real time feeder model, forecast database, load flow database, real-time database, and historian. Core analytic engine 211 is configured to perform core functionalities necessary for grid management applications. This includes network modeling via network modeler 212, topology processing via topology processor 213, load forecasting via load forecaster 214, generation forecasting via generation forecaster 215, load allocation via load allocator 216, online power flow analysis via online power flow component 217, state estimation via state estimator 218, and optimization via optimizer 219.

The network modeler 212 is configured to model one or more distribution feeders. The topology processor 213 codifies network topology and augments the network modeler by incorporating real-time signals to change the network model dynamically. The load forecaster 214 is configured to create time series load data for forecasts including minute-ahead/day-ahead/week-ahead/year-ahead. Generation forecaster 215 is configured to forecast the power output of generators, e.g. solar photovoltaic and wind turbines for the next time interval. Load allocator 216 is configured to use available measurement data to allocate downstream load points based on load types.

In an embodiment, online power flow component 217 includes logic for performing three-phase balanced/unbalanced AC power flow and DC power flow calculations. State estimator 218 is configured to perform real time monitoring of grid voltages, currents, and corresponding power levels via GOS inputs, and perform engineering analysis to estimate discrete and non-discrete system states across the modelled power system. The optimizer 219 determines the optimal solution to a set of linear/non-linear equations given a set of constraint parameters.

The applications engine 220 is a set of applications that provide EPS services. These applications contain the following characteristic processes as the basis for their operation: situational awareness process 221, adaptive protection and control process 222, and system optimization process 223. Situational awareness process 221 provides the ability to perceive elements of the power system with respect to time and/or space, the comprehension of their meanings, sensitive to change, and projections. Adaptive protection and control process 222 provides secondary protection and a supervisory control system where settings and criteria are variable and dynamically configured. System Optimization process 223 is configured to plan, allocate capacity, dispatch, operate, and control the EPS, including generation, storage, and demand resources, to maximize or minimize power system parameters. Application library 224 comprises a set of tools and algorithms that are implemented in software to provide EPS services while taking into account the foreseeable future of a fractal smart grid.

In an embodiment, the system is self-calling. In this respect, as illustrated at reference number 225, the GOS can run itself in parts in parallel simultaneously, or sequentially. For example, the grid operating system may be configured so as to run multiple instances of itself with different variables. Such different variables may be different time frames, different simulator modes and/or different stages, such as an online stage, a day-ahead stage, or a week-ahead stage.

The system can be configured for bidirectional data flow, as illustrated at reference number 226, depending on specific applications.

Figure 3:
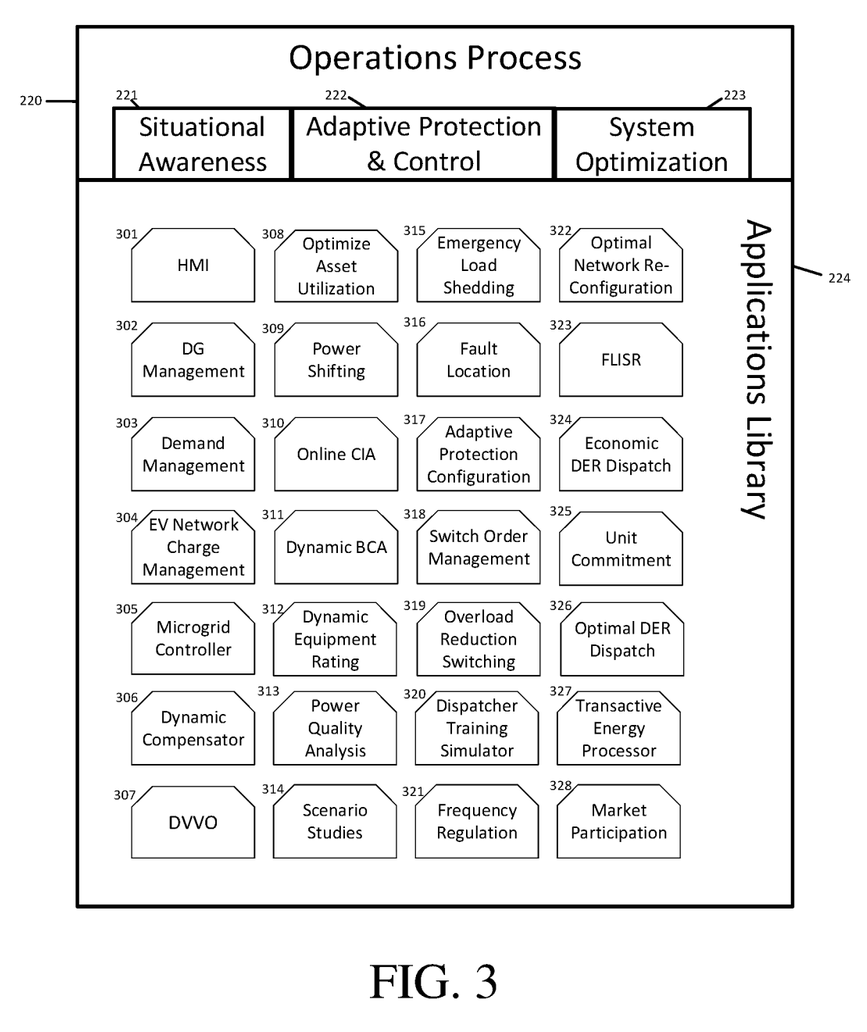
FIG. 3 shows a chart illustrating the core functions of the applications engine.

FIG. 3 shows a chart illustrating the core functions of the applications engine in an embodiment. Human Machine Interface (HMI) 301 provides a graphical user interface that allows users to monitor and control equipment status and system metrics, as well as extract report such as event logs. Generation (DG) Management component 302 monitors, coordinates and controls DGs 103 (FIG. 1) while maintaining reliability of the electricity grid. Demand Management component 303 is configured to monitor connected demand resources 104 (FIG. 1) and dispatch them for load shifting, demand response, generation following, and participating in EPS ancillary services such as frequency regulation. Electric Vehicle (EV) network charge management component 304 controls the charging of electric vehicles as a demand resource, such as by scheduling charging periods. Microgrid controller 305 is configured to control and coordinate the DERs 103-105 (FIG. 1) within a microgrid and to allow islanded operations, maintain voltage and frequency, system protection and implement various control strategies such as Time-Of-Use cost minimization, maximize demand up time or maximize $CO_2$ reduction. Dynamic compensator 306 is provided for controlling the dispatch of flexible DERs 103-105 (FIG. 1), including but not limited to active and reactive power, to compensate for EPS effects, such as the output variability of distributed generation 103.

Dynamic Volt-VAR Optimization (DVVO) 307 component provides a scheme that controls voltage levels or reactive power injection of resources such as load tap changers 110, capacitors 107, voltage regulators 108, and DERs 103-105 to minimize power system losses and improve voltage profile. Optimize asset utilization component 308 optimally utilizes EPS assets based on operation of EPS components 103-110. Power shifting component 309 is configured to move power generation and consumption from one time period to another to minimize cost. This includes peak-shaving and valley-filling services. Connection Impact Assessment (CIA) component 310 is configured to conduct CIA on a real time basis based on updated topology changes. Dynamic Boundary Condition Assessment (BCA) component 311 provides assessment of measured and estimated system operating conditions with predetermined or adaptive system violations. Dynamic equipment rating component 312 provides accurate equipment rating as the equipment is used over time. Power quality analysis component 313 is configured to calculate power quality of the EPS. A scenario studies component 314 is provided to evaluate power system behavior during various loading scenarios and events. An emergency load shedding component 315 is provided and configured to send commands to loads instructing them to reduce under critical overloading situations. A fault location component 316 is configured to identify fault location to the nearest distribution equipment.

With continued reference to FIG. 3, in an embodiment, adaptive protection configuration component 317 is provided for changing relay and other protection settings dynamically based on a real-time grid topology and loading scenario. Switch order management component 318 provides workforce efficiency and prioritization of switching actions to minimize effects of outages. An overload reduction switching component 319 is configured to utilize controllable switches to reconfigure feeder topology to achieve overload reduction by diverting load to other segments or feeders. Dispatcher training simulator 320 provides an EPS simulator that teaches and guides users to operate the GOS 101 (FIG. 1). For example, the dispatcher training simulator 320 can instruct one or more users regarding the process for dispatching DERs.

In an embodiment, a frequency regulation component 321 is provided and configured to coordinate distributed energy resources to regulate frequency within utility boundaries. An optimal network reconfiguration component 322 reconfigures or sends commands to reconfigure network topology to optimize EPS objectives such as improving voltage profile, system loading, and transfer capacity. A Fault Location Isolation and Service Restoration (FLISR) component 323 is provided, and is configured as follows. The FLISR component 323 detects that a feeder fault has occurred; locates the damaged portion of the feeder between two remote controlled line switches; isolates the damaged portion of the feeder by opening appropriate remote controlled line switches; and, re-energizes undamaged portions of the feeder via the primary feeder source and one or more backup sources using remote controlled tie switches. Economic DER dispatch unit 324 dispatches distributed energy resources based on cost minimization optimization. Unit commitment component 325 applies a transmission level generator unit commitment algorithm to the distribution system. Optimal DER dispatch unit 326 optimally dispatches distributed energy resources based on cost minimization, system constraints, power factor correction, or loss reduction. Transactive energy processor 327 calculates the local capacity of DERs and/or load/building management systems to participate in the energy market while maintaining system reliability and efficiency. In an embodiment, a market participation component 328 provides an application platform for selling, producing and buying electricity.

In addition to the embodiments specifically described above, the invention can also be applied in "community" applications with a number of utility customers such as in a microgrid, or "behind the meter" applications within a utility customer or nanogrid, as industrial, building, or home automation systems for energy management.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A non-transient machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A distribution automation applications network, comprising:
   a first intelligent node comprising a hardware and software platform, with data processing and communications functionality, said first intelligent node being integrated or embedded with a grid component selected from the group consisting of: a distributed energy resources controller, a distributed information resource interface, a sensor, a metering collector, a smart meter, a switch controller, a recloser, a substation intelligent electronic device, a computing device at a utility network operations center, a voltage regulator, a component implementing a different grid operating system;
   a second intelligent node comprising a hardware and software platform, with data processing and communications functionality, said second intelligent node being integrated or embedded with a grid component selected from the group consisting of: a distributed energy resources controller, a distributed information resource interface, a sensor, a metering collector, a smart meter, a switch controller, a recloser, a substation intelligent electronic device, or a computing device at a utility network operations center, a voltage regulator, a component implementing a different grid operating system;
   the first intelligent node and the second intelligent node being in communication with each other;
   the first intelligent node and the second intelligent node each implementing a part or whole of a grid operating system comprising one or more software applications for automated and supervisory monitoring, control, protection, and optimization of an electric power system with embedded distributed energy resources and distributed information resources;

a network modeler, an online power flow component, and an optimizer;

wherein said online power flow component comprises logic for performing online three-phase balanced or unbalanced AC power flow calculations;

wherein said optimizer is configured to use said network modeler to optimize said AC power flow calculations of said online power flow component and wherein said first intelligent node and said second intelligent node are configured to use optimized AC power flow calculations to perform grid control to manage connection and operation of said embedded distributed energy resources in said electric power system;

whereby the grid operating system both manages the grid via said grid control and facilitates the integration of distributed energy resources and distributed information resources in an electric power system.

2. The distribution automation applications network according to claim 1, wherein the first intelligent node and the second intelligent node are configured to operate, interoperate, and coordinate with intelligent nodes of at least a second grid operating system on multiple tiers in an electric power system hierarchy.

3. The distribution automation applications network according to claim 2, wherein said electric power system hierarchy comprises a centralized generation hierarchy.

4. The distribution automation applications network according to claim 2, wherein said electric power system hierarchy comprises a transmission hierarchy.

5. The distribution automation applications network according to claim 2, wherein said electric power system hierarchy comprises a distribution hierarchy.

6. The distribution automation applications network according to claim 2, wherein said electric power system hierarchy comprises a sub-distribution hierarchy.

7. The distribution automation applications network according to claim 2, wherein said electric power system hierarchy comprises a community hierarchy.

8. The distribution automation applications network according to claim 1, wherein the system is configured to operate in an automated fashion without operator intervention.

9. The distribution automation applications network according to claim 1, further comprising a provision for operator intervention.

10. The distribution automation applications network according to claim 1, wherein the grid operating system is configured to be self-calling so as to run multiple instances of itself with different variables.

11. The distribution automation applications network according to claim 10, wherein said different variables comprise different time frames.

12. The distribution automation applications network according to claim 10, wherein said different variables comprise different stages.

13. The distribution automation applications network according to claim 12, wherein said different stages comprise at least two stages selected from the set consisting of: an online stage, a day-ahead stage, or a week-ahead stage.

14. The distribution automation applications network according to claim 10, wherein said different variables comprise different simulator modes.

15. A distribution automation applications network, comprising:

Computing hardware instantiating a core analytic engine configured to perform core functionalities necessary for grid management applications, said core analytic engine comprising a network modeler, an online power flow component, and an optimizer;

wherein said online power flow component comprises logic for performing online three-phase balanced or unbalanced AC power flow calculations;

wherein said optimizer is configured to use said network modeler to optimize said AC power flow calculations of said online power flow component;

first and second intelligent nodes configured to use optimized AC power flow calculations to perform grid control to manage connection and operation of embedded distributed energy resources in an electric power system;

computing hardware instantiating an applications engine in communication with said core analytic engine, said applications engine configured to implement a situational awareness process, an adaptive protection and control process, and a system optimization process;

said situational awareness process, adaptive protection and control process, and system optimization process being in communication with an applications library.

16. The distribution automation applications network according to claim 15, wherein said core analytic engine further comprises a topology processor, a load forecaster, a generation forecaster, a load allocator and a state estimator.

17. A distribution automation applications network, comprising:

computing hardware instantiating an applications engine configured to implement a situational awareness process, an adaptive protection and control process, and a system optimization process;

computing hardware instantiating an applications library in communication with said situational awareness process, said adaptive protection and control process, and said system optimization process;

a network modeler, an online power flow component, and an optimizer;

wherein said online power flow component comprises logic for performing online three-phase balanced or unbalanced AC power flow calculations;

wherein said optimizer is configured to use said network modeler to optimize said AC power flow calculations of said online power flow component;

first and second intelligent nodes configured to use optimized AC power flow calculations to perform grid control to manage connection and operation of embedded distributed energy resources in an electric power system;

wherein said applications engine is configured to provide a data flow said from situational awareness process to said adaptive protection and control process to said system optimization process, using said applications library.

* * * * *